Figure 5:
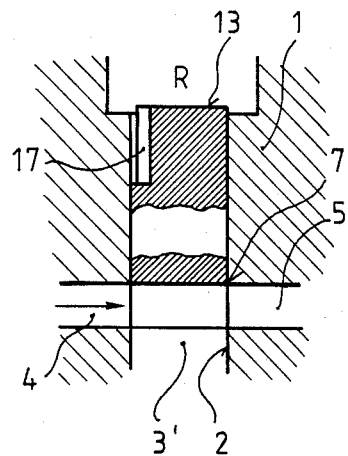

United States Patent [19]

Brunner

[11] Patent Number: 4,557,294

[45] Date of Patent: Dec. 10, 1985

[54] CONTROL VALVE WITH PISTON COMPENSATED BY DISCHARGE PRESSURE

[75] Inventor: Rudolf Brunner, Baldham, Fed. Rep. of Germany

[73] Assignee: Die Heilmeier & Weinlein Fabrik für Oel-Hydraulik GmbH & Co. KG, Munich, Fed. Rep. of Germany

[21] Appl. No.: 571,728

[22] Filed: Jan. 18, 1984

[30] Foreign Application Priority Data

Mar. 10, 1983 [DE] Fed. Rep. of Germany ....... 3308574
Dec. 9, 1983 [EP] European Pat. Off. ......... 83112425.0

[51] Int. Cl.$^4$ ............................................. F15B 13/02
[52] U.S. Cl. ........................... 137/625.68; 137/596.13; 251/282
[58] Field of Search ....................... 137/596.13, 625.68; 251/282

[56] References Cited

U.S. PATENT DOCUMENTS

| 3,820,568 | 6/1974 | Brunner | 137/625.68 |
| 4,301,837 | 11/1981 | Brunner | 137/625.68 |
| 4,323,087 | 4/1982 | Brunner | 137/625.68 |

FOREIGN PATENT DOCUMENTS

| 2912730 | 10/1980 | Fed. Rep. of Germany | 137/625.68 |
| 2914828 | 10/1980 | Fed. Rep. of Germany | 137/625.68 |
| 3000591 | 7/1981 | Fed. Rep. of Germany | 137/625.68 |
| 3004732 | 8/1981 | Fed. Rep. of Germany | 137/625.68 |

Primary Examiner—Gerald A. Michalsky
Attorney, Agent, or Firm—Kinzer, Plyer, Dorn & McEachran

[57] ABSTRACT

The invention relates to a hydraulic control valve comprising a housing with a housing bore (2) formed therein, a control piston (3) being guided in said housing bore for sliding displacement between a neutral position (n) for zero-pressure through-flow and at least one control position (I, II), and further comprising a pressure inlet (6) opening in said housing bore (2), a through-passage (8) in said control piston (3), and a discharge outlet (7) communicating with said pressure inlet via said through-passage in the zero-pressure through-flow position. In a control valve of this type, particularly if employed in a high pressure hydraulic system, displacement of the control piston from a control position to the neutral position is hampered by unsatisfactory pressure compensation. In accordance with the invention, this undesirable effect is avoided by forming substantialy diametrally opposite said discharge outlet (7) a relief area (9, 9', 16, 17, 18, F26) compensating at least the effective area of said discharge outlet and being of substantially the same size as the discharge outlet and subjected to the same pressure as the latter. For ensuring effortless displacement of the control piston of an upstream control valve from its neutral position in a battery-type arrangement of a plurality of control valves even if a downstream control valve is in its control position, there is further provided an area (33) compensating the effective area of the relief area (9, 9', 16, 17, 18, F26) said compensating area communicating with return pressure at least in the neutral position (N).

20 Claims, 10 Drawing Figures

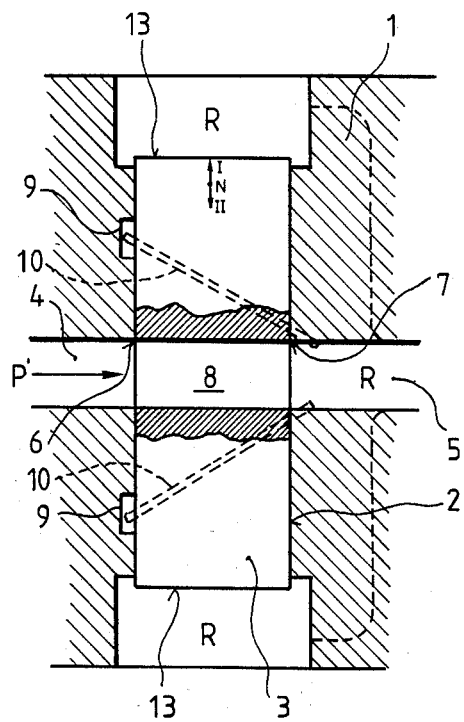
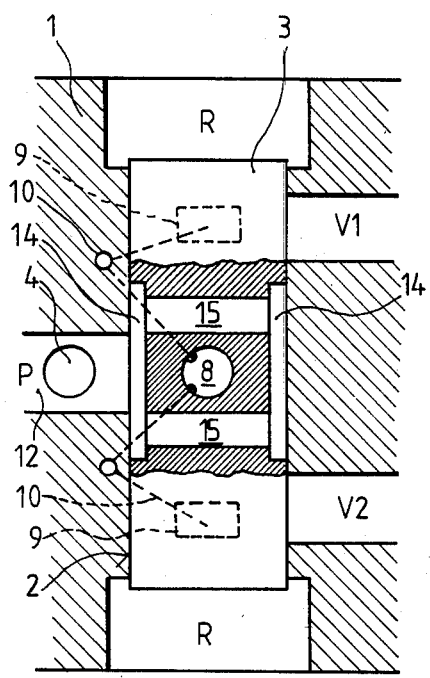
Fig. 1          Fig. 2
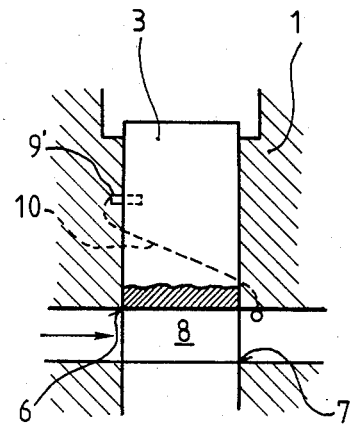
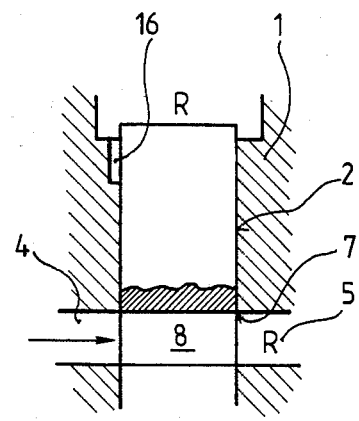
Fig. 3          Fig. 4

CONTROL VALVE WITH PISTON COMPENSATED BY DISCHARGE PRESSURE

The present invention relates to a control valve of the type known from DE-PS 2152830.

In a control valve of this type known from DE-PS No. 2,152,830, FIG. 1, the control piston in each of its control positions obstructs communication from the pressure inlet to the discharge outlet, so that the flow of the pressure medium is directed at the desired pressure through the control piston in a working plane that is offset with respect to the plane of the zero-pressure through-flow. In the pressure inlet the pressure medium exerts the full working pressure on the circumferential surface of the control piston, while the opposite discharge outlet is at zero pressure. Particularly if a control valve of this type is employed in a high pressure hydraulic system, the movements of the control piston are hampered by unsatisfactory pressure compensation mainly in the plane of the zero-pressure through-flow. An improved pressure compensation for the control piston is sought by the arrangement according to FIG. 6 of DE-PS No. 2,152,830, wherein the zero-pressure through-flow is directed through two passages extending through the control piston parallel to one another in one and the same axial plane, the pressure medium flowing through said two passages in opposite flow directions. This results in an overly complicated construction, however. Moreover, it results in the occurrence of undesirably high flow resistance for the zero-pressure through-flow. In addition, pressure compensation continues to be unsatisfactory, as the control piston is subjected to a torque in its control positions. If a plurality of control pistons are disposed in separate bores of a common control valve housing, the pressure compensation effect is neutralized in case of simultaneous actuation of the various control pistons. It has always been believed that the control piston is likely to be jammed by the working pressure acting on its circumferential surface with no oppositely directed pressure acting on its circumferential surface at the discharge outlet. In a control valve known from DE-PS No. 2,910,029, the wall of the housing bore is therefore formed with recesses diametrally opposite the pressure inlet, said recesses communicating with the pressure inlet so as to compensate the effective pressure area thereof. In the control positions the pressure prevailing at the pressure inlet also prevails in the recesses, although in the opposite direction, so that a pressure compensating effect should in fact be expected. In practice it has been found, however, that in the plane of zero-pressure through-flow, satisfactory pressure compensation is still not achieved. This is probably due to the fact that, irrespective of the employment of high-quality material and high finishing precision, the pressure medium is distributed between the circumferential surface of the control piston and the housing bore wall, so that substantially uniform pressure prevails over the entire circumferential surface of the control piston including the area of the pressure inlet. Solely the effective area of the zero-pressure discharge outlet is not subjected to this pressure, resulting in a unidirectional force tending to jam the control piston within the housing bore.

It is therefore an object of the present invention to provide a control valve of the type defined above, wherein the pressure compensation, particularly in the plane of the zero-pressure through-flow, is substantially improved as compared to known control valves of this type. Under the assumption that the pressure prevailing at the pressure inlet is in any case distributed over the full circumferential surface of the control piston, being only absent in the effective area of the discharge outlet, the characteristics of the present valve result in a pressure equilibrium being achieved in the pressure relief area opposite the discharge outlet and the discharge outlet itself. The development of a unidirectional force is thus á priori prevented in a surprisingly simple manner. The control piston can thus be easily shifted from its control position even in case of high flow rates and/or high system pressure.

The pressure compensation for the control piston should preferably be achieved without altering the basic construction of the control valve and without significant increase of the manufacturing costs. This is readily achieved under the present invention. The formation of the recesses in the interior wall surface of the bore and of the channels connecting the recesses with the discharge outlet can be accomplished in a simple and inexpensive manner. A modification of the construction of the control piston is not required.

Of importance in this context also is the provision for ensuring that the relief area does not intersect with the flow paths required for the proper functioning of the control valve as a result of displacements of the control piston.

A further embodiment of the invention requires only minor modifications of the control piston which not only do not interfere with the function of the control piston but moreover, allow the length of the control piston to be reduced for obtaining optimum results.

By another provision it is avoided that the recesses intersect with the flow paths in the housing. Of importance in this context is the provisions of enlarging the opening of the through passage facing the discharge outlet which ensures that there is still an open connection between the through passage and the discharge outlet when the pressure inlet is already closed, so that the pressure within the through passage is permitted to decrease to the pressure level in the outlet channel, whereby the relief areas are also pressure-relieved.

A further advantageous embodiment of a control valve according to the invention is one wherein said control valve is provided with a pump connection passage for the control of working fluid control, at least one consumer connection passage, flow channels formed in the control piston, and a return passage associated with said consumer connection passage. In a control valve of this type the return passage is at zero pressure or in communication, respectively, with the zero-pressure through-flow passage downstream of the control piston. By the connection of the recesses with the respective return passage a zero-pressure condition of the relief area is achieved in a simple manner.

A further advantageous embodiment of a control valve according to the invention is one wherein the ends of the housing bore define return passages associated with the consumer connection passages and adapted to be sealed with respect to the consumer connection passages by the end faces of the control piston. The recesses are in constant communication with the return passages, so that the relief area is maintained at zero pressure conditions.

In modern control valves of this type the housing and the control piston are of very short length, as are also the overlapping ranges. In an advantageous embodiment of the invention this modern construction of the control valve may be retained, since the relief areas are likewise of short axial length. A further advantageous embodiment of a control valve according to the invention is one where in the plane of the zero-pressure throughflow in the housing, each consumer connection passage has associated therewith a continuous return channel extending through the housing bore and located in a common plane with the respective consumer connection passage. Formed within the control piston is a flow channel adapted to connect a consumer connection passage to its associated return channel in each control position of the control piston. This results in a short-length housing and a short-length control piston and enables a simple connection of all return channels to be achieved in the case of a plurality of control valves being combined in a battery-type arrangement. In a control valve embodying these characteristics the pressure compensation for the control piston is achieved without substantially complicating the construction thereof. It is sufficient to merely form the mouth of the return channels opening into the housing bore opposite the discharge outlet in such a manner that the compensating relief areas are created thereby.

A useful embodiment of the invention is also one wherein there is an area compensating the effect of the relief area results in that, if a plurality of such control valves are connected in series and one of the downstream control valves is in its control position, whereby the same pressure, namely, the working pressure, prevails in the pressure inlets and discharge outlets of all control valves upstream thereof, the compensating area, thanks to the pressure relief towards the return passage, compensates the pressure-relieved relief area the effect of which would otherwise again result in a unidirectional force acting on the control piston so as to hamper any displacement of the control piston form its neutral position to a control position. This relief area has to be effective only over a short stroke length of the control piston, namely, during the initial movement from the neutral position towards a control position. Thereafter, i.e. when the compensating area is no longer in communication with the return passage, it wll no longer have any effect on the displacement of the control piston.

Structurally this object may be attained in the simplest manner by two recesses which may be simply formed as blind bores with a conical cross-sectional shape. By their overlapping with the return passage it is ensured that in the neutral position the effective area of the relief area, which is also under pressure relief, is compensated.

Finally a further useful embodiment of the invention is one wherein at least one circumferential pressure compensation groove is provided in the bore wall surface adjacent each consumer connection passage between the respectibe consumer connection passage and the pump connection passage. These pressure compensation grooves are intended to more evenly distribute the initially mentioned pressure developing between the circumferential surface of the control piston and the interior wall surface of the bore, and at the same time to accurately insulate axial portions of the circumferential surface of the control piston subjected to high pressure from other portions subjected to lower pressures. In cooperation with the relief area and the compensating area, this results in the effect of the compensating recesses being reduced during displacements of the control piston with overlapping of any of the pressure compensating grooves with the compensating recesses.

Figure 6:
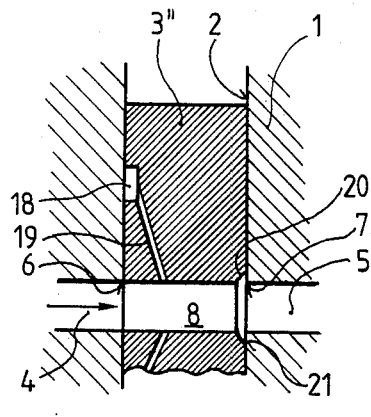
Figure 7:
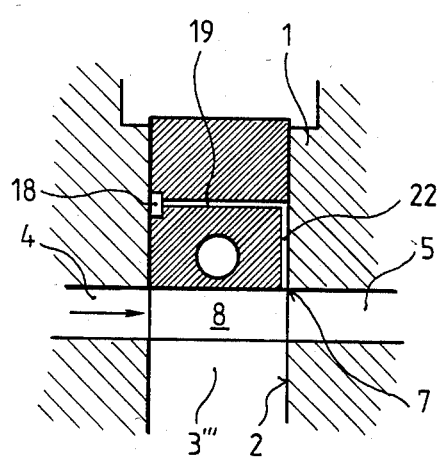
Figure 8:
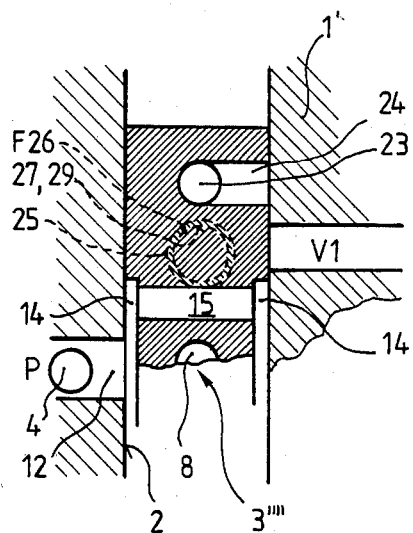
Figure 9:
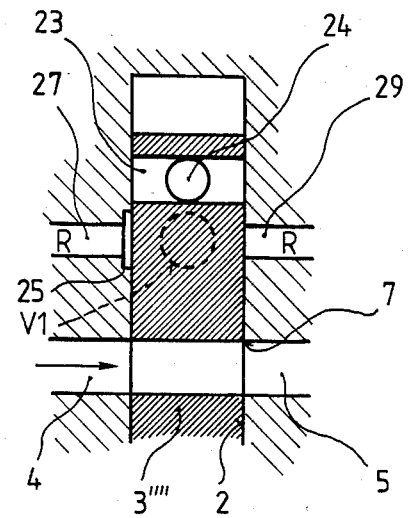
Figure 10:
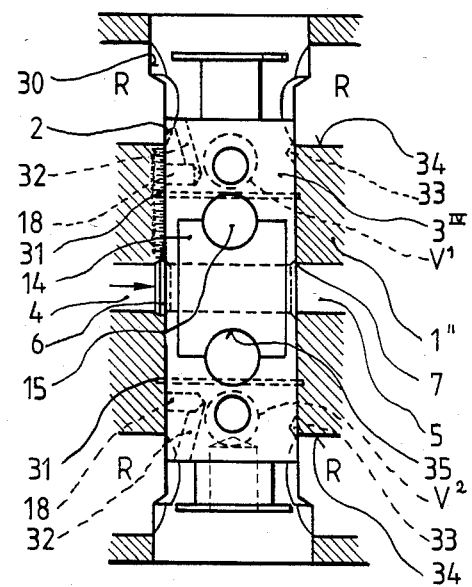

Embodiments of the invention shall now be described in detail with reference to the accompanying drawings, wherein:

FIG. 1 shows a longitudinal section of a first embodiment of a control valve,

FIG. 2 shows a sectional view of the control valve of FIG. 1 rotated by an angle of 90°, FIG. 3 shows a partial sectional view of a further embodiment, FIG. 4 shows a partial longitudinal section through a still further embodiment, FIG. 5 shows a partial longitudinal section through another embodiment, FIG. 6 shows a partial longitudinal section through still another embodiment, FIG. 7 shows a partial longitudinal section through still another embodiment, FIG. 8 shows a partial longitudinal section through an embodiment of a control valve corresponding to the one shown in FIG. 2, FIG. 9 shows a partial longitudinal section through the control valve of FIG. 8 rotated by an angle of 90°, and FIG. 10 shows a diagrammatical sectional view of a still further embodiment.

A control valve 1 shown in FIGS. 1 and 2 comprises a housing 1 having a bore 2, in which a non-rotatable control piston 3 is adapted to be shifted between a neutral position N and a first and second control position I and II, respectively.

In the plane of the so-called zero-pressure through-flow (FIG. 1), pressure P' prevails in a pressure channel 4 leading to a pressure inlet 6 opening into housing bore 2. Diametrically opposite pressure inlet 6, a discharge outlet leads to a discharge channel 5 connected to a return flow system R or being at zero pressure. Control piston 3 is formed with a through passage 8 establishing comminication between pressure inlet 6 and discharge outlet 7 in the netral position N.

The wall of housing bore 2 is formed with recesses 9 located opposite discharge outlet 7 at both sides of pressure inlet 6 in symmetric arrangement in the direction of the longitudinal axis of the bore 2. A channel 10 formed in housing 1 communicates each recess 9 with discharge outlet 7 or discharge passage 5, respectively.

In this embodiment, the ends of housing bores 2 are formed as return passages R closed by the end faces 13 of control piston 3. As shown in dotted lines, return passages R may be in communication with discharge passage 5. As an alternative, separate discharge ducts may be provided for the return passages.

An alternative flow connection may be optionally provided in place of channels 10 for communicating recesses 9 with return passages R.

The working plane of the control valve (FIG. 2) is offset from the zero-pressure through-flow plane (FIG. 1) by an angle of 90°. In the working plane a pump connection passage extends through housing 1 to open into housing bore 2, pressure inlet passage 4 branching off said pump connection passage 12. Passage 12 is under pump pressure P diametrally opposite pump connection channel 12 and offset therefrom in the longitudinal direction of control piston 3 housing 1 is formed with consumer connection passages V1 and V2 leading to suitable consumers (not shown).

In the working plane control piston 3 is formed with a flow chamber 14 facing pump connection passage 12, and diametrally opposite thereto with a second flow chamber 14, both said flow chambers 14 being connected to one another by two flow channels 15. Through-passage 8 is located between the two flow channels 15 so as to intersect them at right angles.

Recesses 9 are shown by dotted lines in FIG. 2. They communicate through passages 10 with discharge passage 5 extending vertical to the plane of the drawing.

In FIGS. 1 and 2 the pressure of pump connection channel 12 prevails in both flow chambers 14. The pressure medium also enters pressure channel 4 and flows through passage 8 into discharge passage 5, whereby the pump pressure is relieved. At the same time, recesses 9 are pressure-relieved through passages 10.

As soon as control piston 3 is shifted upwards in the drawing to its control position I, its circumferential surface seals pressure inlet 6, while discharge passage 5 remains in a pressure-relief condition. As a result, pressure in pump connection channel 12 rapidly increases. Through the righthand flow chamber 14 in FIG. 2, the pressure medium flows into consumer connection passage V1. At the same time, the lower end face 13 of control piston 3 moves away from the mouth of consumer connection channel V2, so that pressure medium can flow therefrom into the lower return passage R.

In the control position I, the pressure also acts in pressure inlet 6 and seeks its way along the circumferential surface of the control piston. This means that the pressure tends to distribute over the full circumference of the control piston. Only at the location of discharge outlet 7 the pressure does not come into effect, as this area is pressure-relieved. In the same manner the pressure will not come into effect in the recesses 9, as they are also pressure-relieved. The two recesses 9 (cf. FIG. 2) thus form zero-pressure relief areas on the circumferential surface of control piston 3 effective to compensate the zero-pressure area of discharge outlet 7 in such a manner that the pressure acting on the circumferential surface of the control piston cannot develop into a unidirectional force. As a result, the control piston offers little resistance to displacement from its control position.

In the embodiment of FIG. 3, the recesses 9' (only the upper one of which is shown) are formed as arcuate slots of narrow width in the axial direction extending in circumferential direction over a portion of the housing bore wall. The total relief area formed by these recesses 9' is substantially of the same size as the effective area of discharge outlet 7. As in the embodiment of FIG. 1, the recesses 9' may again communicate with the discharge outlet via channels 10, or alternatively with the return passage via channels connected to the return passages (not shown).

In the embodiment according to FIG. 4, the housing bore wall is formed with recesses 16 located diametrally opposite the discharge outlet closely adjacent the end of the housing bore and opening towards the interior of the housing bore as well as towards the return passage R, so that they are always pressure-relieved.

In the embodiment of FIG. 5, a control piston 3' slidably guided in housing bore 2 has its outer periphery formed with a recess 17 extending up to end face 13 and opening towards the housing bore wall. A similar recess is provided at the other end of control piston 3', although not shown in the drawing. In this embodiment, the two recesses 17 form a relief area for compensating the effective area of discharge outlet 7.

In the embodiment of FIG. 6, the circumferential surface portion of a control piston 3" diametrally opposite discharge outlet 7 is formed with pocket-shaped recesses 18 communicating with through-passage 8 via channels 19 and forming a relief area for compensating the zero-pressure effective area of discharge outlet 7 by being pressure-relieved into through-passage 8. For ensuring reliable pressure-relief of through-passage 8 itself on displacement of the control piston into or from one of its control positions, the opening 21 of through-passage 8 facing discharge outlet 7 is enlarged by a conical counterbore 20, communication between through-channel 8 and discharge channel 5 is always established or interrupted, respectively prior to establishment and subsequent to interruption of communication between through-channel 8 and pressure inlet channel 4.

In the embodiment according to FIG. 7, the recesses 18 formed in the circumferential surface of the control piston are in constant communication with through-passage 8 and discharge outlet 7 via a passage 19 opening at the opposite side of the circumferential surface of the control piston and an axially extending groove 22 formed in said surface. This is a particularly effective arrangement if the control valve 1 is combined with similar control valves in a battery-type arrangement in which at least the zero-pressure through-passage extends through all of the so combined control valves. If in this case the last control valve in the downstream direction is in one of its control positions, the discharge outlets 7 and pressure inlets 5 are all under full working pressure, this pressure also acting, however, in the recesses 18, so that the respective control pistons are pressure-compensated, permitting them to be shifted from their neutral positions with little effort.

FIGS. 8 and 9 show a control valve the housing 1" of which is formed with a return channel 27, 29 also extending through housing bore 2. At the side of the housing bore wall diametrally opposite discharge outlet 7, return channel 27 is formed with a conical or cylindrical counterbore 25 opening into housing bore 2, the cross-sectional area of counterbore 25 being larger than that of the opening of return channel portion 29 at the opposite side of the housing bore wall, as indicated by the cross-hatched annular area F26 in FIG. 8. In this manner, a relief area is again formed for compensating the zero-pressure effective area of discharge outlet 7.

This arrangement of return channels 27 and 29 is conducive to achieving a desirably short length in the construction of the housing and control piston 3''''. To ensure communication of each consumer connection passage (only consumer connection passage V1 being shown in the drawing) with return channels 27 and 29 in a control position of control piston 3'''', the control piston is formed with a through-passage 23 in the plane of zero-passage through-flow, and with a branch passage 24 extending therefrom and aligned with consumer connection passage V1 in a control position of control piston 3'''', so that the pressure medium may flow therefrom into the return passage. Return channels 27 and 29, by the way, are located in the plane of zero-pressure through-flow extending at right angles to the working plane (FIG. 8).

If the housing is formed with two return passage sections 27 and 29 extending therethrough, as shown in FIG. 9, and the control valve is further provided with two consumer connection passages and thus with two such return passages, the size of each relief area F26 need only be half that of the effective area of discharge outlet 7. If on the other hand there is provided only one consumer connection passage and one return passage, the relief area F26 has to be of the same size as the effective area of the discharge outlet 7.

In a control valve having only the return passage section 27 without the provision of the other return passage section 29, the area of the opening of return passage 27 in the housing bore wall has to be of the same size as the effective area of the discharge outlet if there is only one such return passage and one consumer connection passage, or half the size, respectively, of the effective area of the discharge outlet, if there are two consumer connection passages and two return passages.

FIG. 10 shows a longitudinal sectional view of an embodiment of a control valve taken in the plane of zero-pressure through-flow through housing 1''. A pressure medium entering through inlet passage 4 flows through passage 8 formed in control piston $3^{IV}$ in the direction towards discharge passage 5. Control piston $3^{IV}$ is slidably guided in housing bore 2 and is shown in FIG. 10 in its neutral position, i.e. in the zero-pressure through-flow position. Flow chambers 14 formed in the control piston communicate with one another through passages 15. In alignment with consumer connection passages V1 and V2, control piston $3^{IV}$ is further formed with through-passages 35 serving for pressure compensation in a plane perpendicular to the zero-pressure through-flow plane. Housing bore 2 is formed with enlarged end portions 30. Housing 1 is further formed with return passages R intersecting housing bore 2 adjacent the enlarged end portions 30 thereof so as to define interior edges 34 the purpose of which will be explained hereinafter. Adjacent each consumer connection passage V1 and V2, the housing bore wall is formed with a circumferential pressure compensation groove 31.

Recesses 18 formed in the circumferential surface of the control piston and serving as the compensation area for discharge outlet 7 communicate with the end faces of the control piston via oblique passages 32, so that recesses 18 are always at the return passage pressure. Diametrally opposite recesses 18 and slightly offset with respect thereto in the direction towards the end faces of the control piston, the circumferential surface of the control piston is formed with recesses 33 defining an area compensating the relief area, said recesses being of outwards opening conical shape. In the neutral position of the control piston each recess 33 overlaps the edge 34 defined by the associated return passage R, thus forming said compensating area extending from the respective edge 34 towards discharge outlet 7 in the neutral position of the control piston. These areas have therefore the shape of a full circle minus a lens-shaped area resulting from the overlapping of return passages R with the circular periphery of the respective recess 33.

Particularly if the housings 1'' of a plurality of such control valves are combined in the form of a battery-type arrangement, in which aligned channels 4 and 5 form a continuous zero-pressure through-flow passage and the aligned return passages R form a continuous return path, displacement of a downstream control valve will result in the passages 4 and 5 upstream thereof being at full working pressure. As explained above, this working pressure is distributed to a certain degree along the circumference of the control pistons in the upstream control valves. Since the relief area formed by recesses 18 communicates with the return passage and is therefore pressure-relieved, this pressure would result in a unidirectional force acting on the control piston at the side thereof opposite recesses 18, such force being effective to noticeably hamper displacement of the control piston from its neutral position to a control position. In practical experiments it has been found that displacement of a thus jammed control piston requires a relatively great breakaway force hampering any fine adjustment of the control piston particularly during the first phase of its displacement from the neutral position. This undesirable effect is avoided, however, by the area of recesses 18 being compensated by recesses 33 themselves communicating with the return passages and being therefore pressure-relieved. As a result, any unidirectional force acting on the control piston is prevented from developing, so that little effort is required for shifting the control piston from its neutral position. After the initial displacement of the control piston from its neutral position, communication of one of recesses 33 with the respective return passages is interrupted. This fact is of no particular consequence, however, as the further displacement of the control piston does no longer require excessive effort.

In the embodiment shown, recesses 18 are formed as blind bores communicating with passages 32. In order to save space in the longitudinal direction of the control piston, the recesses could also be formed similar to the slots 9 in the FIG. 3 embodiment or by a plurality of smaller radial blind bores arranged side by side in the circumferential direction and having a combined sectional area of sufficient magnitude to define the required compensation area. All of these blind bores would have a joint flow connection with passage 32.

I claim:

1. A hydraulic control valve particularly for use in a high pressure hydraulic system wherein a plurality of control valves are combined in a battery-type arrangement, comprising a housing (1, 1', 1'') formed with a housing bore (2), a control piston (3, 3', 3'', 3''', 3'''', $3^{IV}$) being guided in said housing bore between a neutral position for zero-pressure through-flow for controlling the flow of a working medium and at least one control position, and further comprising a pressure inlet (4) opening into said housing bore and being communicable with a pump passage (P) supplied with pump pressure, a through-passage (8) in said control piston adapted to be aligned with said pressure inlet, a pair of consumer connection passages (V1,V2) each for receiving pressure medium in respectively different control positions of the piston, and a discharge outlet (5) communicating with said pressure inlet via said through-passage in the zero-pressure through-flow position, characterized in that substantially diametrically opposite said discharge outlet (5) there is provided at least one relief area (9, 9', 16, 17, 18, F26) for the circumferential surface of said control piston together with a channel for communicating discharge pressure thereto for compensating the effective area of said discharge outlet (5), the effective area of said relief area being substantially of the same size as that of said discharge outlet.

2. A control valve according to claim 1, characterized in that the housing bore wall diametrically opposite said discharge outlet is formed with two relief areas (9) symmetrically offset in the longitudinal direction of said housing bore (2) and opening toward said housing bore (2), said recesses (9) communicating with said discharge outlet via passages (10) formed in said housing (1).

3. A control valve according to claim 2, characterized in that the axial distance between said pressure inlet (6) and each said recess (9, 9') formed in the housing bore wall is greater than the stroke of said control piston (3) between said neutral position (N) and each control position (I, II).

4. A control valve according to claim 1, characterized in that the axial distance between said pressure inlet (6) and each said relief area formed in the housing bore wall being greater than the stroke of said control piston (3) between said neutral position (N) and each control position (I, II).

5. A control valve according to claim 1, characterized in that the circumferential surface of said control piston (3) is formed with recesses (18) communicating with said through-passage (8) via passages (19, 22) formed in said control piston.

6. A control valve according to claim 5, characterized in that in the neutral position of said control piston (3), the axial distance between the opening of said through-passage (8) facing said pressure inlet (6) and each of said recesses (16, 17, 18) formed in the circumferential surface of said control piston is greater than the stroke of said control piston (3, 3') between said neutral position (N) and each control position (I, II).

7. A control valve according to claim 6, characterized in that the opening (21) of said through-passage (8) facing said discharge outlet (7) is of greater axial width than the opening of said through-passage (8) facing said pressure inlet (6).

8. A control valve according to claim 5, characterized in that the opening (21) of said through-passage (8) facing said discharge outlet (7) is of greater axial width than the opening of said through-passage (8) facing said pressure inlet (6).

9. A control valve according to claim 1, characterized in that the opening (21) of said through-passage (8) facing said discharge outlet (7) is of greater axial width than the opening of said through-passage (8) facing said pressure inlet (6).

10. A control valve according to claim 9, further including working fluid control means including a pump connection passage (12) opening into said housing bore (2), flow channels (14, 15) formed in said control piston, and a return passage (R) associated to each consumer connection passage, characterized in that said relief area (9, 9', 16, 18) communicates with the adjacent return passage (R).

11. A control valve according to claim 10, wherein said return passage (R) associated with said consumer connection passages (V1, V2) are formed by the end portions of said housing bore (2), said return passages being adapted to be closed off from said consumer connection passages by the end portions (13) of said control piston (3), characterized in that the relief areas (16) formed in said housing bore (2) communicate with the end portions of said housing bore (2).

12. A control valve according to claim 11, characterized in that the relief areas (17,18) are formed in the circumferential surface of said control piston (3) and communicate with the adjacent end portions (13) of said control piston.

13. A control valve according to claim 12 characterized in that the relief areas (17,18) communicate with a return passage.

14. A control valve according to claim 10, characterized in that each relief area (9) is formed as a circumferential slot of reduced axial width extending over a major portion of the housing bore wall.

15. A control valve according to claim 10, wherein in the zero-pressure through-flow plane in said housing (1') each consumer connection passage (V1) has associated therewith a continuous return passage (27) extending through said housing bore (2) in the same axial plane as said consumer connection passage, and wherein said control piston (3'''') is formed with a flow passage (23, 24) communicating a consumer connection passage with said return passage in each control portion of said control piston, characterized in that the opening (25) of said return passage (27) into said housing bore (2) located diametrically opposite said discharge outlet (7) is greater than the opening of said return passage (29) in said housing bore located at the same side as said discharge outlet (7) by a relief area (F26), the size of said relief area (F26) corresponding to the effective area of the discharge outlet (7) return passages provided in combination with consumer connection passages.

16. A control valve according to claim 10, characterized in that the housing bore (2) is formed with a compensation area (33) for compensating the effective area of said relief area (9, 9', 16, 17, 18) and located diametrically opposite thereto, said compensation area being supplied with the pressure prevailing in said return passage (R) at least in the neutral position (N) of said control piston (3).

17. A control valve according to claim 16, characterized in that said compensation area is in the form of open recesses in the circumferential surface of said control piston, said recesses overlapping said return passage in the neutral position of said control piston.

18. A control valve according to claim 17, wherein at least one circumferentially extending pressure compensating groove (31) is formed in the housing bore wall between each consumer connection passage (V1, V2) and said pump connection passage and located more closely adjacent to said consumer connection passage, characterized in that the recesses in the circumferential surface of said control piston defining said relief area as well as the recesses (33) in the circumferential surface of said control piston defining said compensation area extend to axial locations on the circumferential surface of the control piston passing over at least one of said pressure compensation grooves (31) on displacement of said control piston toward a control position.

19. A control valve according to claim 10, characterized in that each relief area (18) is formed in the circumferential surface of said control piston.

20. A control valve according to claim 10, characterized in that the circumferential surface of said control piston (3) is formed with a compensation area (33) for compensating the effective area of said relief area (9, 9', 16, 17, 18) and located diametrically opposite thereto, said compensation area being supplied with the pressure prevailing in said return passage (R) at least in the neutral position (N) of said control piston (3).

* * * * *